United States Patent [19]

Dufour et al.

[11] Patent Number: 4,603,336

[45] Date of Patent: Jul. 29, 1986

[54] TRANSFER MECHANISM FOR MULTIPLE STATION IMAGING/PRINTING APPARATUS

[75] Inventors: Charles H. Dufour; Mark F. Duchesne, both of Somersworth, N.H.

[73] Assignee: Harris Graphics Corporation, Melbourne, Fla.

[21] Appl. No.: 603,902

[22] Filed: Apr. 25, 1984

[51] Int. Cl.⁴ ........................ G01D 15/14; G11B 9/00; G03G 15/00

[52] U.S. Cl. .................................... 346/74.2; 346/160; 355/3 R; 355/3 TE

[58] Field of Search ..................... 346/153.1, 160, 74.2; 358/300-302; 355/3 R, 3 TE, 46; 101/152, 153

[56] References Cited

U.S. PATENT DOCUMENTS

| | | | |
|---|---|---|---|
| 3,783,782 | 1/1974 | Hardt | 101/152 X |
| 3,936,171 | 2/1976 | Brooke | 355/3 R |
| 4,195,927 | 4/1980 | Fotland et al. | 355/3 TE |
| 4,403,226 | 9/1983 | Gaudioso | 346/74.4 |

*Primary Examiner*—E. A. Goldberg

*Assistant Examiner*—Linda M. Peco

*Attorney, Agent, or Firm*—Antonelli, Terry & Wands

[57] ABSTRACT

A transfer mechanism for a magnetographic recording apparatus employs a pair of imaging/printing drums arranged for pivotal translation past one another so as to be controllably positionable at a respective one of imaging and printing stations. At the imaging station a latent image of the desired graphics/text to be reproduced is written onto a first drum while, at the same time, at the printing station, a latent image that was previously written at the imaging station onto a second drum is employed for hard copy reproduction. The transfer mechanism preferably comprises a set of rotatably driven and meshed gear wheels about the respective axes of which pivot of a pair of support arms upon which the imaging/printing drums are mounted. The support arms for a first of the drums are mounted for rotation with a first of the gear wheels about the axis of the first wheel, while the support arms for the second of the drums are mounted for rotation with a second of the gear wheels that mesh with the first wheel about the axis of the second of the gear wheels.

50 Claims, 3 Drawing Figures

TRANSFER MECHANISM FOR MULTIPLE STATION IMAGING/PRINTING APPARATUS

FIELD OF THE INVENTION

The present invention relates to recording/reproduction apparatus and is particularly directed to a multiple station imaging/printing configuration and a mechanism for simultaneously transferring multiple imaging/printing media between stations.

BACKGROUND OF THE INVENTION

Multidocument recording/reproduction apparatus, such as electrographic or magnetographic recording apparatus, typically employ a common medium for recording (or storing) the latent image of information, such as text and/or graphics, to be reproduced on a continuous web or separate sheets of copy material. It is often the case that the storage/printing medium takes the form of a rotating drum the surface of which is comprised of a material on which an image storage pattern is written at an imaging station located at a first tangential position around the surface of the drum, and subsequently reproduced or read out (printed) on a hard copy document at a printing station that is located at a second tangential position of the drum. Since the printing customarily involves the use of a toner applicator (decorator), a cleaning station is further disposed at a third tangential position around the drum.

Because of the relatively close proximity of the imaging and printing stations to one another and the fact that the drum cleaning (toner removal) station does not always perfectly remove unused (non document-transferred) toner or other foreign matter from the surface of the drum, the operation of the imaging station may be adversely affected, whereby information to be imaged may be imperfectly written onto the drum (e.g. blank data), so that the resulting copy produced at the printing station is unacceptable.

SUMMARY OF THE INVENTION

This shortcoming in conventional recording apparatus is circumvented by a multiple, separated imaging and printing station configuration in accordance with the present invention wherein a plurality of image storage and printing media (drums) are transferrable between the separate stations at which image recording and document printing are respectively carried out. Pursuant to a preferred embodiment of the present invention a pair of imaging/printing drums are arranged for pivotal translation past one another so as to be controllably positionable at a respective one of the imaging and printing stations.

The recording mechanism is of the type that affords long term storage capability, such as a magnetographic storage mechanism wherein a latent image, once recorded, may be used repeatedly for document reproduction without having to refresh or recharge the storage medium for each copy, as is required in conventional electrographic recording apparatus. Because of this property of a magnetographic storage mechanism and the physical separation between the imaging and printing stations each station may be dedicated to its own function. Moreover, this exclusivity of function assignment at each station and the ability to interchange or perform a switch over or transfer of the magnetographic storage medium between the imaging and printing stations, offers a number of advantages over conventional schemes.

In accordance with the present invention, at the imaging station a latent image of the desired graphics/text to be reproduced is written onto a first storage medium (e.g. magnetographic storage drum) while, at the same time, at the printing station, a latent image that was previously written at the imaging station onto a second storage medium is employed for hard copy reproduction. Because the imaging process is conducted on a storage medium that is not to be immediately used for the printing process, a larger time window for generating the image can be provided (i.e. increased bandwidth), thereby providing a sufficient period for achieving any desired resolution for the recorded graphics/text. Moreover, the physical separation between the imaging and printing stations assists in minimizing contamination of the storage medium at the imaging station by foreign matter (e.g. toner residue) present at the printing station.

A significant aspect of the multiple station configuration according to the present invention is the storage medium transfer mechanism for simultaneously exchanging or transferring an imaged drum to the printing station and transferring the printing drum to the imaging station. As discussed above, the use of the plural stations and plural storage media enhances image quality. It also improves yield. Once the imaging station has completed the storage on a first drum the latent image to be subsequently printed at the printing station, that drum is ready to be used to print the desired number of hard copies. For fairly long printing runs, as in a magazine page copy run, the print cycle will usually involve a period of time in excess of that required for imaging. This means that once the print cycle is completed for one latent image, the system will have a new latent image on another drum already prepared for printing.

The simultaneous drum exchange/transfer mechanism of the present invention offers a facility for rapidly removing the printing drum away from the printing station and inserting in its place the drum that has been at the image station and presently contains a to-be-printed new latent image. The printing drum is transferred to the imaging station where, with the old image removed, a new latent image may be written for a subsequent run. In other words, the two drums are successively and repeatedly transferred between the imaging and printing stations.

The transfer mechanism itself preferably comprises a set of rotatably driven and meshed gear wheels about the respective axes of which pivot of a pair of support arms upon which the imaging/printing drums are mounted. The suppport arms for a first of the drums are mounted for rotation with a first of the gear wheels about the axis of the first wheel, while the support arms for the second of the drums are mounted for rotation with a second of the gear wheels that mesh with the first wheel about the axis of the second of the gear wheels. The fact that the axes of rotation of the two sets of support arms for the imaging/printing drums are offset from one another permits the arc of travel of the axis of one drum, as its support arm/gear wheel is rotated, to be offset from the arc of travel of the other drum. In addition the lateral spacing between the support arms for one drum is narrower than that for the support arms for the other drum; this spacing differential together with the arc of travel offset of the two sets of support arms permits one drum to be pivotally translated past and in close proximity of the other drum. As a result of this pivotal travel/support scheme, a simplified and space saving arrangement is afforded while permitting a synchronized and rapid transfer of the drums between stations.

DETAILED DESCRIPTION

Figure 1:
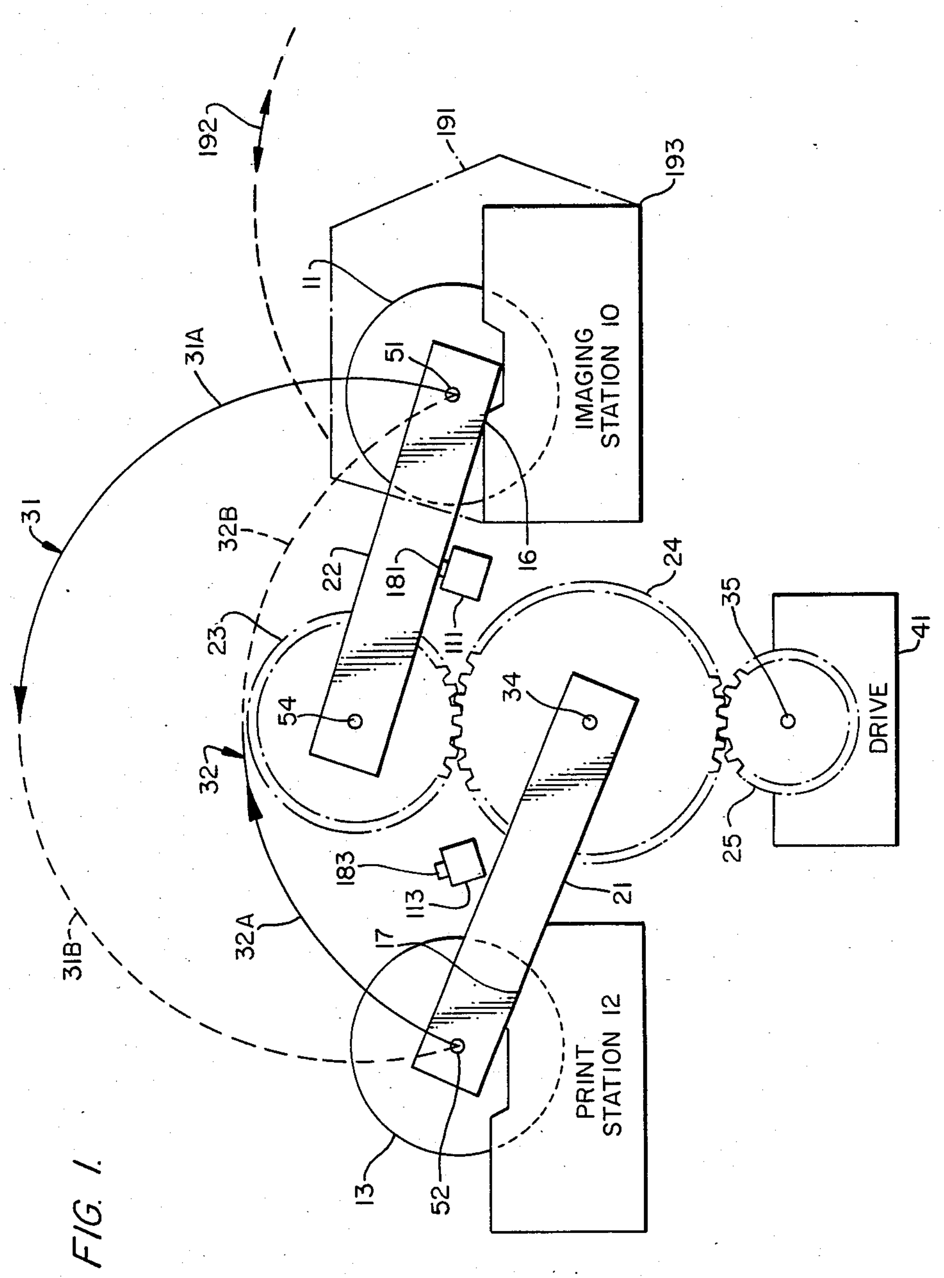
FIG. 1 is a schematic side view illustration of a multiple station transfer mechanism for a magnetographic recording apparatus.

Referring now to FIG. 1, there is shown a schematic side view illustration of the multiple station transfer mechanism according to the present invention employing, respectively, a spaced apart imaging station 10 and a printing station 12. In accordance with a preferred embodiment of the invention, the imaging/printing scheme is magnetographic, as a magnetographic storage medium (e.g. $CrO_2$) is capable of effectively permanent storage of a latent image pattern that can be used for continuous hard copy reproduction as contrasted to an electrographic scheme which requires repeated refreshing or rewriting of the latent image on the storage medium for successive document reproductions. Thus, printing station 12 contains those components customarily employed in a unified magnetographic recording apparatus for writing the latent image on a drum 11. The surface of each of drums 11 and 13 is formed of a material such as chromium dioxide that stores a latent image representative of an information signal applied thereto in the form of a magnetic field from a write head, not shown. Preferably the write head comprises a hydrodynamic type of magnetic write head arrangement as described in copending application Ser. No. 519,759, filed Aug. 2, 1983, by Andrew M. Bardos and Jon E. Holmes for an invention entitled "Method and Apparatus for Hydrodynamic Magnetographic Recording", and assigned to the Assignee of the present application. As described in that application, through the use of a hydrodynamic magnetic write head arrangement, effective intimate coupling between the write head and the surface of the recording is afforded while, at the same time, head life is improved. The hydrodynamic imaging arrangement also helps clean the surface of the drum and the head, so that image quality is enhanced.

During the writing or recording of information onto the drum at the imaging station 10, the magnetic write head is preferably slowly scanned across the drum (i.e. moved in a direction parallel to axis 51 about which drum 11 rotates, thereby affording high resolution latent image generation. Namely, because of the provision of separate imaging and printing stations, the latent image that is recorded on drum 11 need not be employed immediately for hard copy reproduction, as in conventional arrangements. This dual facility thereby allows a longer period of time (or wider imaging time window) for recording (i.e. the recording process can be slowed down), so that enhanced image resolution may be obtained, as through the use of a head scanning mechanism. (This contrasts sharply with conventional digital write head arrangements that employ a line of write heads extending along the length of the drum for achieving high speed digital image generation and which are not suitable for high resolution analog image recording).

Imaging station 10 also includes erase head, auxiliary cleaning (e.g. vacuum knives) and attendant drum drying mechanisms (not shown) a description and illustration of which are not necessary for purposes of an understanding the present invention. In other words, imaging station 10 includes those components of a magnetographic recording apparatus that are employed for imaging, and preferably includes a magnetic head scanning facility and a hydrodynamic imaging mechanism as discussed above and described in detail in the above-referenced copending application. However, imaging station 10 does not include those components of a magnetographic recording apparatus that are employed for printing. These devices are instead contained exclusively at printing station 12 which, in turn, contains no mechanism for imaging. Again, as was the case for imaging station 10, those components of a magnetographic recording apparatus that are employed for printing (e.g. decorator, web transfer rollers, fuser, etc.) are not shown in FIG. 1 as they may be conventional and are not necessary for an understanding of the present invention.

Figure 2:
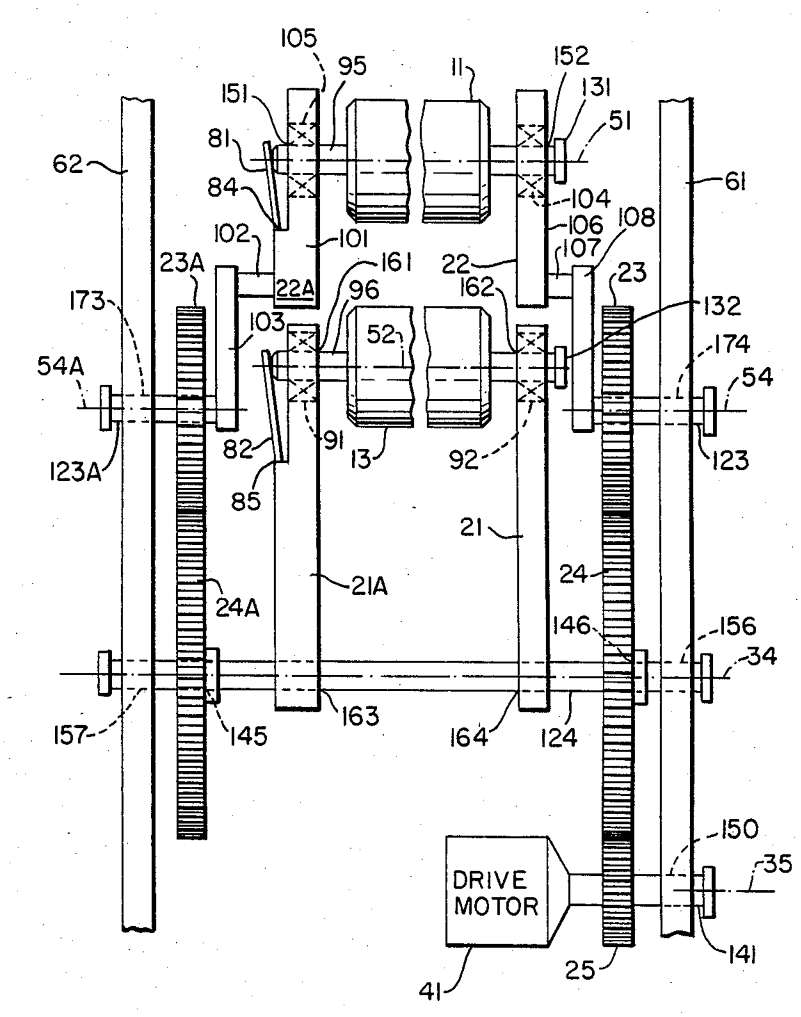
FIG. 2 is a front view illustration of the transfer mechanism of FIG. 1 showing the details of the pivoting and support arrangement therein.

As described briefly above, the transfer mechanism for interchanging the drum 11 at the imaging station 10 and the drum 13 at the printing station 12 includes a set of gear wheel driven arm units, shown in the side view of the transfer mechanism in FIG. 1 and illustrated in greater structural detail in the front view of the transfer mechanism in FIG. 2. FIG. 1 schematically illustrates one side of the transfer mechanism, whereas FIG. 2 shows a front view of the support arm structure and gear coupling arrangements at the opposite ends of the drums.

Figure 3:
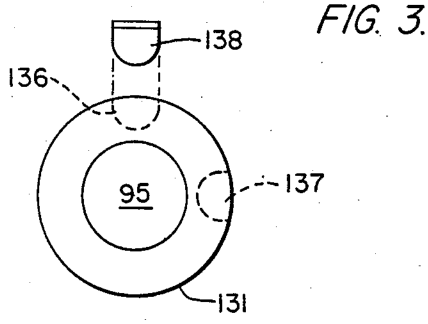
FIG. 3 is a side view of a drive coupling ring as mounted on a drum rotation shaft.

Drum 11, which, as shown in FIG. 1, is positioned at the imaging station 10, is supported by a support arm structure rotatably comprising a pair of arms 22 and 22A through which a drum shaft 95 passes and is supported by bearings mounted therein. One end of shaft 95 is supported by a bearing 105 provided in a slot 152 in an upper support section 106 of support arm 22. Rigidly affixed to the end of shaft 95 is a drive coupling member 131 (shown in greater detail in FIG. 3, described below) which engages a respective drum drive mechanism at each of the imaging station and the printing station for causing rotation of drum 11 thereat. Preferably drive coupling member 131 comprises a ring as shown in detail in FIG. 3, integral with shaft 95. A pair of grooves or depressions 136, 137 are provided in the circumferential surface of the ring 131 at prescribed angular locations about axis 51, so as to be aligned with a respective drive engagement pin 138 of the respective drive mechanism at each of the imaging and printing stations. Prior to transfer of drum 11 from one station to another, shaft 95 is controllably rotated to bring coupling member 131 into a prescribed rotation position about axis 51. This may be accomplished by aligning a mark (not shown) on coupling ring member 131 with a corresponding mark on a transfer arm, for example. Shaft 95 and drum 11 are then locked in position between support arms 22, 22A, so that when transferred to the other station, that one of grooves 136, 137 that is to be engaged by drive engagement pin 138 is aligned therewith upon reaching that station. Shaft 95 and drum 11 are then unlocked and drive engagement with one of grooves 136, 137 via pin 138 is effected.

The lower end of support arm 22 is coupled through a vertically offsetting center section 107 to a lower arm section 108. Similarly, the opposite end of the drum shaft 95 is rotatably supported by bearing 104 provided in a slot 151 passing through the upper portion of upper support section 101. A grounding tab 81 is affixed at a lower end 84 thereof to the upper arm section 101 and is urged against the end of shaft 95, so as to retain shaft 95 and thereby drum 11 in position in the upper section of 101 of the support arm 22A. Upper section 101 of support arm 22A is coupled to a lower section 103 by a center section 102, section 103 being offset, vertically, as shown, from upper section 101. This offsetting of upper arm sections 101 and 107 of support arms 22A and 22 by sections 102 and 107, respectively, permits the support arms 21A and 21 for drum 13 to pass within the separation distance of the upper support arms and thereby permit close proximity translation of the drums relative to one another, as will be explained in greater detail below.

Lower arm sections 103 and 108, respectively, of support arms 22A and 22 for drum 11 are rigidly affixed to a pair of shafts 123A and 123. Shaft 123 is coaxial with the axis 54 of a gear wheel 23 and rotatably passes through a slot 174 in a support frame 61. Similarly, shaft 123A is coaxial with the axis 54A of a gear wheel 23A and rotatably passes through a slot 173 in a support frame 62. Support frames 61 and 62 are that part of the main body of the support structure for supporting the drum positioning and translation mechanism. The teeth that are provided on the periphery of gear wheel 23 mesh with the teeth on the periphery of another gear wheel 24 that is fixedly attached to a main shaft 124 that rotatably rides in a slot 156 in support frame 61 and in a slot 157 and support frame 62. The teeth of gear wheel 24 also engage the teeth on the periphery of a gear wheel 25 that is fixedly attached to a drive shaft 41 that rotatably rides in a slot 150 in support frame 61 and is driven by a drive motor 41. Through this correction, energization of drive motor 41 causes the rotation of its output drive shaft 41, rotation of gear wheels 25, 24 and 23 and, consequentially, drive shafts 124, 123 and 123A. Since upper support arms 22 and 22A for drum 11 are affixed to drive shaft 123 and 123A, respectively, of upper gear wheels 23 and 23A, operation of drive motor 41 causes the movement of the support arms and, as a result, the translation of upper drum 11 along a travel arc 31 (shown in FIG. 1).

Travel arc 31 is shown as comprising a solid line portion 31A representing the initial path of travel of the axis 51 of drum 11 as it is moved from image station 10 toward the print station 12. Similarly, travel arc 32 represents the path of travel of drum 13, a first solid line portion 32A of which represents the initial travel of axis 52 of drum 11 as arms 21 and 21A are pivoted by the rotation of gear wheel 24 and gear wheel 24A, respectively. Dotted line portions 31B and 32B of travel arcs 31 and 32, respectively, represent the further portions of arcs 31 and 32 along which drums 11 and 13 travel when they are in closer proximity to stations 12 and 10 than stations 10 and 12, respectively.

As mentioned above, drum 13 is rotated by support arms 21 and 21A. For this purpose, drum 13 has an axis 52 that is coaxial with, and the drum itself is affixed to and supported by, a drum shaft 96. Shaft 96 is supported by a bearing 92 that is provided in a slot 162 of support arm 21 and by a bearing 91 that is provided in a slot 161 within support arm 21A. Like shaft 95 of drum 11, described above, shaft 96 of drum 13 has rigidly affixed to one end thereof a grooved drive coupling ring 132 which engages respective drum drive mechanisms at the imaging and printing station for causing rotation of drum 13 thereat. As is the case with drive engagement ring 131 on shaft 95 of drum 11 shown in FIG. 3, drive engagement ring 132 has channeled therein a pair of grooves at prescribed angular locations about axis 52 so as to be aligned with respective drive engagement pins of the drive mechanisms for the shafts of drums 11 and 13 at each of the imaging and printing stations. Also, like coupling member 131 on shaft 95, coupling member 132 on shaft 96 and shaft 96 are controllably rotated to bring coupling member 132 into a prescribed rotational position about axis 52 prior to a drum transfer between stations. Shaft 96 and drum 12 are then locked in position between support arms 21, 21A so that, when transferred to the other station, a prescribed one of the grooves in member 132 is aligned with a drive engagement pin. Shaft 96 and drum 12 are then unlocked and drive engagement between the pin and the prescribed groove in ring 132 is performed.

A grounding tab 82 is affixed at its lower end 85 to support arm 21A and is urged against the end of shaft 96 to retain drum 13 in an axial stable position between arms 21 and 21A just as bias plate 81 provides a similar function for shaft 95 of drum 11 between support arms 22 and 22A. The lower end 164 (as shown in FIG. 2) of support arm 21 is affixed to shaft 124, while the lower end 163 of support arm 21 is affixed to shaft 124. Because shaft 124 is affixed to gear wheels 24 and 24A, rotation of gear wheels 24 and 24A causes a corresponding rotation of arms 21 and 21A and thereby the movement or travel of drum 13 along its travel arc 32. In the embodiment shown, the gear ratios of gear wheels 23, 24, 25 are 60:100:40. These gear ratios are, of course, not limitative but simply provide an illustration of parametric values that provide the transfer mechanism as illustrated with the drums 11 and 13 being able to pass in close proximity of one another, thereby achieving a spacing saving exchange mechanism. In this regard, in the position shown in FIG. 2, drums 11 and 13 are respectively at the uppermost portion of arcs 31 and 32 as they pass by one another.

In their functional positions at the respective printing and imaging stations, a stop detector 111 and a stop detector 113 may be provided at imaging station 10 and printing station 12, respectively. The stop detectors may include respective trip switches 181 and 183 that are activated by arm 22, when the drums 11 and 13 are at their proper positions at stations 10 and 12 as determined by the rotational position of arm 22 about axis 54.

As will be appreciated from the foregoing description of the configuration of the transfer mechanism according to the present invention, through the use of a simplified gear drive/support arm arrangement, synchronized pivotable translation of a pair of print drums between respective imaging and printing stations is provided. The offset and spacing of support arms 22, 22A and 21, 21A and the fact that they are commonly driven by the same shaft 124 permits rapid interchange of the drums 11 and 13 between the imaging and printing stations. In the positions of the drums as shown in FIG. 1, drum 11 is being imaged while a previously recorded image on drum 13 (i.e. a latent image that was previously recorded on drum 13 at imaging station 10) is being reproduced on hard copy at the printing station 12.

As mentioned previously, typically, for long print runs, the time required to store a latent image on a drum at the imaging station 10, even for high resolution analog imaging, is less than the time of the print run at printing station 12. As a result, the imaging process at imaging station 10 can be expected to be completed prior to the total copy print run at print station 12 so that when the printing cycle has been completed at printing station 12, the transfer mechanism may be activated for immediate transfer of the drums between the printing and imaging stations and a new print cycle begun. Of course, prior to printing, the drum that had been employed at the printing station is completely cleaned and erased, so as to be effectively free of foreign matter/contaminants. With a hydrodynamic imaging process carried out at imaging station 10, as may be accomplished by the mechanism described in the above-identified copending application, the image that is stored on the recording drum at the printing station is of extremely high quality. Moreover, because the printing station and the imaging station are physically separated from one another, particles that are normally contained in the environment of the printing operation at the printing station are effectively segregated from, and thereby not introduced into, the environment of the imaging station, so as not to cause a degradation in the quality of the latent image that is generated at the imaging station 10. Of course, this is facilitated by use of the hydrodynamic imaging process described in the above-mentioned copending application, as mentioned previously.

As a further expedient for preventing contamination of the imaging drum at imaging station 10 by the operation of printing station 12, imaging station 10 may be provided with an imaging drum protective cover or shield 191, shown in dot-dashed lines about drum 11 at imaging station 10 in FIG. 1. For drum transfer, shield 191 is pivoted along arc 192 about an axis 193 so as to permit unobstructed interchange of drums 11 and 13 between stations. Once the imaging drum has been transferred to imaging station 10, cover 191 is pivoted into position along travel path 192 so as to enclose drum 11 and thereby further prevent the contamination of the surface of drum 11 by foreign matter such as toner at print station 12.

Although, in accordance with the above-described preferred embodiment of the invention, two stations, one for imaging and one for printing, between which a pair of imaging/printing drums are alternately transferred are employed, it should be noted that a multiple drum configuration employing a transfer mechanism as well as an imaging/print mechanism embodying the principles of the invention but not exactly as that described in the foregoing may be employed. For example, a trio of imaging/printing drums, as opposed to a pair of drums shown in the above-described embodiment, may be translated past respective imaging, cleaning and printing stations. This may be achieved by mounting the imaging/print cylinders on a triangular-configured turret. When one drum is located at the printing station, a second drum is located at an imaging station, and a third drum is located at a cleaning station. The turret rotates about an axis such that the drum that has been employed for printing is moved to the cleaning station, the drum at the cleaning station is transferred to the imaging station, and the imaged drum at the imaging station is transferred to the printing station. This provides the above desired isolation between the printing station (press room environment) and the imaging and cleaning stations.

Moreover, in place of the rotational or pivotal translation of the image/print drums between the cleaning/imaging station and the printing station, the drums may be translated linearly along their axes. This may be accomplished, for example, by a system of chucks which load, unload and exchange the drums between the respective imaging and printing stations.

It is also possible to provide a transfer track upon which the support shafts for the drums are positioned. The drums may be transported perpendicular to their axes of rotation from the printing station to the imaging station and vice versa by means of tracks or ways. This is similar to the above-described linear translation environment employing chucks, in that the type of translation employed is essentially a linear translation. Still, the advantages of the present invention are attained, since the printing and imaging stations are separated from one another.

As noted previously, an important aspect of the present invention is the fact that through the use of separate imaging and printing stations, down time of the printing station is kept to a minimum, since imaging of the next latent image for hard copy reproduction can be carried out simultaneously and apart from the print station. This affords the capability of higher image resolution through the increased time window for imaging. Moreover, through the use of hydrodynamic imaging, foreign matter, e.g. toner contamination is effectively eliminated. While exclusively of imaging and printing at the respective stations is preferred, as described above, the objects of the invention can be achieved by employing a pair of unified stations, each of which includes imaging, cleaning and decorator/printing mechanisms. The two stations are separated such that while one is imaging, the other is printing. Because the station that is printing is separated from the station that is imaging, toner contamination of the imaging process is prevented. The print web is positioned in contact with the drum at one of the stations for printing, while it is separated from the drum at the other station which is being imaged. Each drum alternates between imaging and printing, so that there is effectively provided a pair of complete imaging/printing assemblies that can be used for both sides of a reproduction web.

As an enhancement of the preferred embodiment of the invention described above in conjunction with FIGS. 1 and 2, each of drums 11 and 13 may be provided with an auxiliary motor which is used to drive a previously imaged drum at the imaging station in rotation as it approaches the printing station. The motor is operated as the drum travels from the imaging station along arc 31 so that as it reaches the print station 12 its tangential speed at the point of contact with the printing web matches the speed and phase of the web as it comes into contact with the imaging drum. This effectively minimizes web waste between print runs and it is not necessary to energize the toner fuser between print cycles.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. A recording apparatus wherein an image is stored on a recording medium and a copy of said image is reproduced therefrom, the recording apparatus comprising:

a first station and a second station separate from said first station;

a first and second recording mediums;

first means for forming a latent image on the first recording medium at the first station;

second means for reproducing, at the second station an image which has been formed on the second recording medium; and third means continuously and directly coupled to said first and second recording media, for transferring said first recording medium from said first station to said second station and transferring said second recording medium from said second station to said first station.

2. An apparatus according to claim 1, wherein said second means comprises means for reproducing, at said second station, an image which has been formed on said second recording medium, simultaneously with the forming of a latent image by said first means and said first station.

3. An apparatus according to claim 1, wherein said third means comprises means for simultaneously transferring said first and second recording media between said first and second stations.

4. An apparatus according to claim 1, wherein said first station is exclusive of means for reproducing an image from a recording medium.

5. An apparatus according to claim 1, wherein said second station is exclusive of means for forming an image on a recording medium.

6. An apparatus according to claim 4, wherein said second station is exclusive of means for forming an image on a recording medium.

7. An apparatus according to claim 1, wherein said recording apparatus is a magnetographic recording apparatus.

8. An apparatus according to claim 7, wherein said third means comprises means for simultaneously pivotally transferring said first recording medium from said first station to said second station while pivotally transferring said second recording medium from said second station to said first station.

9. An apparatus according to claim 8, wherein said third means comprises means for transferring said first recording medium from said first station along a first prescribed arcuate path to said second station while transferring said second recording medium along a second prescribed arcuate path to said first station.

10. An apparatus according to claim 1, wherein said first station is provided with a recording medium enclosure for protecting said first recording medium thereat from the introduction of foreign matter in the course of forming said latent image thereon.

11. A recording apparatus wherein an image is stored on a recording medium and a copy of said image is reproduced therefrom, the recording apparatus comprising:

a first station and a second station separate from said first station;

first and second recording mediums;

first means for forming a latent image on the first recording medium at the first station;

second means for reproducing, at the second station, an image which has been formed on the second recording medium; and third means coupled to said first and second recording media, for transferring said first and second recording media between said first and second stations, whereby said second means reproduces the image formed on said first recording medium at said first station and said first means forms a new image on said second recording medium transferred to said first station from said second station by said third means, said third means comprises means for simultaneously transferring said first recording medium from said first station to said second station while transferring said second recording medium to said first station, each of said first and second recording media comprises a respective image storage drum supported for movement along first and second arcuate paths, respectively and wherein said third means further comprises a first pair of support arms for supporting said first image storage drum and a first pair of wheels coupled thereto, the rotation of which causes rotational movement of said first pair of support arms and consequently transfer of said first image storage drum along said first prescribed arcuate path.

12. An apparatus according to claim 11, wherein said third means further comprises a second pair of support arms for supporting said second image storage drum and a second pair of wheels coupled-thereto, the rotation of which causes rotational movement of said second pair of support arms and consequently transfer of said second image storage drum along said second prescribed arcuate path.

13. An apparatus according to claim 12, wherein the axis of rotation of said first pair of wheels is offset from the axis of rotation of said second pair of wheels.

14. An apparatus according to claim 12, wherein said first and second pairs of wheels respectively comprise first and second pairs of gear wheels that are meshed with one another.

15. An apparatus according to claim 14, wherein said third means comprises drive means coupled to one of said gear wheels for causing rotation of the same and thereby synchronous transfer of each of said first and second recording drums between said stations.

16. A recording apparatus wherein an image is stored on a recording medium and a copy of said image is reproduced therefrom, the recording apparatus comprising:

a first station and a second station separate from said first station;

first and second recording mediums;

first means for forming a latent image on the first recording medium at the first station;

second means for reproducing, at the second station, an image which has been formed on the second recording medium; and third means coupled to said first and second recording media, for transferring said first and second recording media between said first and second stations, whereby said second means reproduces the image formed on said first recording medium at said first station and said first means forms a new image on said second recording medium transferred to said first station from said second station by said third means.

17. An apparatus according to claim 16, wherein said third means comprises means for simultaneously transferring said first recording medium from said first station to said second station while transferring said second recording medium to said first station.

18. An apparatus according to claim 17, wherein each of said first and second recording media comprises a respective image storage drum supported for movement along first and second arcuate paths, respectively.

19. An apparatus according to claim 18, wherein each of said first and second drums is provided with a rotatable drive shaft for causing rotation of said drums at said stations, each drive shaft having coupled thereto means for engaging a respective drive mechanism at a station.

20. A recording apparatus wherein an image is stored on a recording medium and a copy of said image is reproduced therefrom, the recording apparatus comprising:

a first station and a second station separate from said first station;

first and second recording mediums;

first means for forming a latent image on the first recording medium at the first station;

second means for reproducing, at the second station, an image which has been formed on the second recording medium; and third means coupled to said first and second recording media, for transferring said first and second recording media between said first and second stations, whereby said second means reproduces the image formed on said first recording medium at said first station and said first means forms a new image on said second recording medium transferred to said first station from said second station by said third means, said third means comprises means for simultaneously transferring said first recording medium from said first station to said second station while transferring said second recording medium to said first station, each of said first and second recording media comprises a respective image storage drum supported for movement along first and second arcuate paths, respectively, and wherein said third means further comprises a first pair of support arms for supporting said first image storage drum and a first pair of rotatable shafts coupled thereto, the rotation of which causes rotational movement of said first pair of support arms and consequently transfer of said first image storage drum along said first prescribed arcuate path.

21. An apparatus according to claim 20, wherein said third means further comprises a second pair of support arms for supporting said second image storage drum and a rotatable shaft coupled thereto, the rotation of which causes rotational movement of said second pair of support arms and consequently transfer of said second image storage drum along said second prescribed arcuate path.

22. An apparatus according to claim 21, wherein the support arms of said first pair of support arms are spaced apart from one another so as to permit said second pair of support arms to pass therebetween during transfer thereof between said first and second stations.

23. An apparatus according to claim 22, wherein said third means comprises a first pair of gear wheels respectively affixed to said first pair of rotatable shafts and a second pair of gear wheels, that engage said first pair of gear wheels, affixed to the shaft to which said second pair of support arms are coupled.

24. A recording apparatus wherein an image is stored on a recording medium and a copy of said image is reproduced therefrom, the recording apparatus comprising:

a first station and a second station separate from said first station;

first and second image storage media respectively disposed in said first and second stations;

means for causing a latent image to be formed on said first image storage medium at said first station and causing an image stored on said second recording medium to be reproduced therefrom at said second station; and means coupled to each of said first and second image storage media, for transferring said first and second image storage media between said first and second stations, whereby said means for causing the latent image formed on said first storage medium at said first station may be reproduced at said second station and, at said first station, a new image may be formed on said second storage medium that has been transferred thereto from said second station by said means coupled to said first and second image storage media.

25. An apparatus according to claim 24, wherein each of said image storage media comprises a recording surface of an image storage drum.

26. An apparatus according to claim 25, wherein each of said drums is provided with a rotatable drive shaft for causing rotation of said drums at said stations, each drive shaft having coupled thereto means for engaging a respective drive mechanism at a station.

27. An apparatus according to claim 24, wherein said recording apparatus is a magnetographic recording apparatus.

28. An apparatus according to claim 24, wherein said third means comprises means for simultaneously transferring said first and second recording media between said first and second stations.

29. An apparatus according to claim 28, wherein said second station is exclusive of means for forming an image on a recording medium.

30. An apparatus according to claim 29, wherein said first station is exclusive of means for reproducing an image from a recording medium.

31. An apparatus according to claim 24, wherein said first station is provided with a recording medium enclosure for protecting a recording medium thereat from the introduction of foreign matter in the course of forming said latent image thereon.

32. A method of recording and reproducing information, the method comprising the steps of:

(a) providing a first station and a second station separate from said first station;

(b) forming a latent image of information on a recording medium at the first station;

(c) reproducing at the second station the recording medium there at, an image of information that has been formed as a latent image on a recording medium;

(d) transferring the recording medium on which said latent image has been formed in step (b) to said second station;

(e) transferring the recording medium, from which an image has been reproduced at said second station, from said second station to said first station and wherein steps (b) and (c) are carried out simultaneously.

33. A method of recording and reproducing information, the method comprising the steps of:

(a) providing a first station and a second station separate from said first station;

(b) forming a latent image of information on a recording medium at the first station;

(c) reproducing at the second station the recording medium there at, an image of information that has been formed as a latent image on a recording medium;

(d) transferring the recording medium on which said latent image has been formed in step (b) to said second station;

(e) transferring the recording medium, from which an image has been reproduced at said second station, from said second station to said first station; and wherein steps (d) and (e) are carried out simultaneously.

34. A method of recording and reproducing information, the method comprising the steps of:

(a) providing a first station and a second station separate from said first station;

(b) forming a latent image of information on a recording medium after the first station;

(c) reproducing at the second station the recording medium thereat, an image of information that has been formed as a latent image on a recording medium;

(d) transferring the recording medium on which said latent image has been formed in step (b) to said second station;

(e) transferring the recording medium from which an image has been reproduced at said second station, from said second station to said first station;

(f) successively repeating steps (b)-(e), whereby, at said first station, step (b) causes a latent image of information to be formed on a recording medium transferred thereto from said second station and, at said second station, step (c) causes the reproduction of an image that has been previously formed at said first station; and wherein steps (d) and (e) are effected by a means directly and continuously coupled to the recording medium thereby enabling the transfer of the respective recording medium between the first and second stations.

35. A method of recording and reproducing information, the method comprising the steps of:

(a) providing a first station and a second station separate from said first station;

(b) forming a latent image of information on a recording medium at the first station;

(c) reproducing at the second station the recording medium there at, an image of information that has been formed as a latent image on a recording medium;

(d) transferring the recording medium on which said latent image has been formed in step (b) to said second station;

(e) transferring the recording medium, from which an image has been reproduced at said second station, from said second station to said first station; and wherein steps (b) and (e) comprise pivotally transferring said recording media between said first and second stations.

36. A method of recording and reproducing information, the method comprising the steps of:

(a) providing a first station and a second station separate from said first station;

(b) forming a latent image of information on a recording medium at the first station;

(c) reproducing at the second station the recording medium there at, an image of information that has been formed as a latent image on a recording medium;

(d) transferring the recording medium on which said latent image has been formed in step (b) to said second station;

(e) transferring the recording medium, from which an image has been reproduced at said second station, from said second station to said first station; and wherein step (d) is carried out in synchronism with step (e).

37. A method of recording and reproducing information, the method comprising the steps of:

(a) providing a first station and a second station separate from said first station;

(b) forming a latent image of information on a recording medium at the first station;

(c) reproducing at the second station the recording medium thereat, an image of information that has been formed as a latent image on a recording medium;

(d) transferring the recording medium on which said latent image has been formed in step (b) to said second station;

(e) transferring the recording medium, from which an image has been reproduced at said second station, from said second station to said first station;

wherein step (b) comprises forming a latent image of information on a first storage medium at said first station; and step (c) comprises reproducing an image of information from a second storage medium, on which information has been previously recorded at said first station, at said second station; and wherein steps (d) and (e) are effected by a means directly and continuously coupled to the first and second storage media thereby enabling the transfer of the respective recording media between the first and second stations.

38. A method of recording and reproducing information, the method comprising the steps of:

(a) providing a first station and a second station separate from said first station;

(b) forming a latent image of information on a recording medium at the first station;

(c) reproducing at the second station the recording medium thereat, an image of information that has been formed as the latent image on a recording medium;

(d) transferring the recording medium on which said latent image has been formed in step (b) to said second station;

(e) transferring the recording medium, from which an image has been reproduced at said second station, from said second station to said first station;

wherein step (b) comprises forming a latent magnetic image of information onto a first magnetic storage medium at said first station;

step (c) comprises reproducing an image of information from a second magnetic storage drum, onto which information has been previously magnetically recorded at said first station, at said second station; and wherein steps (d) and (e) are effected by a means directly and continuously coupled to the respective recording media thereby enabling a transfer of the respective recording media between the first and second stations.

39. A method according to claim 38, further comprising the steps of:

(c) transferring the medium on which said latent image has been formed in step (b) to said second station; and (d) transferring the recording medium, from which an image has been reproduced at said second station, from said second station to said first station.

40. A method according to claim 39, wherein steps (d) and (e) comprise pivotally transferring said recording media between said first and second stations.

41. A method of recording and reproducing information, the method comprising the steps of:

(a) providing a first station and a second station separate from said first station;

(b) forming a latent image of information on a recording medium at the first station;

(c) reproducing at the second station the recording medium there at, an image of information that has been formed as a latent image on a recording medium;

(d) transferring the recording medium on which said latent image has been formed in step (b) to said second station;

(e) transferring the recording medium, from which an image has been reproduced at said second station, from said second station to said first station; and wherein each of said recording media comprises an image storage drum rotatable about a drive shaft therefor, and step (d) includes the step of causing, in the course of transfer, rotation of the image storage drum on which said latent image has been formed in step (b) so as to synchronize the tangential speed of said drum with that of a reproduction medium onto which the image of said drum is transferred at said second station.

42. A recording apparatus wherein an image is stored on a recording medium and a copy of said image is reproduced therefrom, the recording apparatus comprising:

a first imaging station and a second reproducing station disposed apart from said first imaging station;

first and second recording mediums;

first means at said first station for forming a latent image on the first recording medium;

second means disposed at the second station for reproducing an image which has been formed on the second recording medium by said first means at said first station; and third means, coupled to said first and second recording media, for transferring, simultaneously, a first recording medium from said first station to said second station so that a latent image that has been formed on said first recording medium by said first means at said first station may be coupled to said second means at said second station for reproducing therefrom an image which has been formed thereon by said first means at said first station, and said second recording medium from which an image has been reproduced by said second means at said second station from said second stationto said first station.

43. An apparatus according to claim 42, wherein said first station is exclusive of means for reproducing an image from a recording medium.

44. An apparatus according to claim 43, wherein said second station is exclusive of means for forming an image on a recording medium.

45. An apparatus according to claim 42, wherein said recording apparatus is a magnetographic recording apparatus.

46. An apparatus according to claim 42, wherein said third means comprises means for simultaneously pivotally transferring said first recording medium from said first station to said second station while pivotally transferring said second recording medium from said second station to said first station.

47. An apparatus according to claim 46, wherein said third means comprises means for transferring said first recording medium from said first station along a first prescribed arcuate path to said second station while transferring said second recording medium along a second prescribed arcuate path to said first station.

48. An apparatus according to claim 42, wherein each of said first and second recording media comprises a respective image storage drum supported for movement along first and second arcuate paths, respectively.

49. A recording apparatus wherein an image is stored on a recording medium and a copy of said image is reproduced therefrom, the recording apparatus comprising:

a first imaging station and a second reproducing station disposed apart from said first imaging station;

first means at said first station for forming a latent image on a first recording medium;

second means disposed at the second station for reproducing an image which has been formed on the second recording medium by said first means at said first station;

third means, coupled to said first and second recording media, for transferring, simultaneously, a first recording medium from said first station to said second station so that a latent image that has been formed on said first recording medium by said first means at said first station may be coupled to said second means at said second station for reproducing therefrom an image which has been formed thereon by said first means at said first station, and a second recording medium from which an image has been reproduced by said second means at said second station from said second station to said first station, each of said first and second recording media comprises a respective image storage drum supported for movement along first and second arcuate paths, respectively; and wherein said third means further comprises a first pair of support arms for supporting said first image storage drum and a first pair of wheels coupled thereto, the rotation of which causes rotational movement of said first pair of said support arms and consequently transfer of said first image storage drum along said first prescribed arcuate path.

50. An arrangement according to claim 49, wherein said third means further comprises a first pair of gear wheels respectively affixed to a first pair of rotatable shafts and a second pair of gear wheels, then engage said first pair of gear wheels, affixed to a shaft to which a second pair of support arms are coupled.

* * * * *